(12) United States Patent
Snyder

(10) Patent No.: US 9,744,424 B1
(45) Date of Patent: Aug. 29, 2017

(54) SCHEDULING SYSTEM

(71) Applicant: Kavita Ramchandani Snyder, Saratoga, CA (US)

(72) Inventor: Kavita Ramchandani Snyder, Saratoga, CA (US)

( * ) Notice: Subject to any disclaimer, the term of this patent is extended or adjusted under 35 U.S.C. 154(b) by 0 days.

(21) Appl. No.: 15/231,048

(22) Filed: Aug. 8, 2016

(51) Int. Cl.
*A63B 71/00* (2006.01)
*A63B 69/38* (2006.01)

(52) U.S. Cl.
CPC ............. *A63B 71/00* (2013.01); *A63B 69/38* (2013.01)

(58) Field of Classification Search
USPC .......................................................... 700/91
See application file for complete search history.

(56) References Cited

U.S. PATENT DOCUMENTS

| 6,289,348 | B1 * | 9/2001 | Richard | G06Q 10/10 |
| 2011/0320375 | A1 * | 12/2011 | Zrike | G06Q 10/107 |
| | | | | 705/319 |
| 2012/0270618 | A1 * | 10/2012 | Abramoff | G07F 17/3288 |
| | | | | 463/9 |
| 2014/0038729 | A1 * | 2/2014 | Borge | G06Q 10/10 |
| | | | | 463/42 |
| 2014/0229996 | A1 * | 8/2014 | Ellis | H04N 5/44543 |
| | | | | 725/61 |
| 2016/0070452 | A1 * | 3/2016 | Lawson | G07F 17/3276 |
| | | | | 463/29 |
| 2016/0171905 | A1 * | 6/2016 | Nusbaum | G09B 19/00 |
| | | | | 434/127 |
| 2016/0243404 | A1 * | 8/2016 | Keller | G09B 5/02 |

* cited by examiner

*Primary Examiner* — Pierre E Elisca

(57) ABSTRACT

The present disclosure relates to a novel scheduling system and in particular, a system for scheduling matches, practices, and related activities. The novel system includes a non-transitory machine readable storage medium containing instructions to cause a machine to generate a line-up for a match between at least two sports team; generate a food assignment for the match; generate a practice schedule for each sport team; and generate a series of line-ups for a season of play. Additionally, the non-transitory machine readable storage medium further contains instructions to cause a machine to generate a ranking of each sport team based on a record of each sports team.

20 Claims, 8 Drawing Sheets

FIGURE 1

▼ New Practice

Your Team *
[- Select - ⌄] — 101
Choose your team to assign this practice to.

Practice Description and Notes

[ 102 ]

Enter details about the practice (Description, notes, etc.)

Practice Start Date *

Date                    Time
[ 103 ]                 [ 104 ]
E.g., 03/20/2016        E.g., 10:12 am Repeat Count
[ 1 ] — 105   Enter the number of weeks for this practice to repeat. (Automatically creates that many practices)

( Add practice )

FIGURE 2

Singles Selection (select 2)

| Name | Lineup |
|---|---|
| ☐ Player1_1 Smith | |
| ☐ player1_2@tennisfolder.com | |
| ☐ player1_5@tennisfolder.com | |
| ☐ player1_11@tennisfolder.com | |

Doubles Selection (select 3)

| Name | Partner2 | Lineup |
|---|---|---|
| ☐ Player1_1 Smith | player1_7@tennisfolder.com | |
| ☐ Player1_1 Smith | player1_9@tennisfolder.com | |
| ☐ Player1_1 Smith | player1_5@tennisfolder.com | |
| ☐ Player1_1 Smith | player1_6@tennisfolder.com | |
| ☐ Player1_1 Smith | player1_10@tennisfolder.com | |
| ☐ Player1_1 Smith | player1_11@tennisfolder.com | |
| ☐ player1_7@tennisfolder.com | player1_9@tennisfolder.com | |
| ☐ player1_5@tennisfolder.com | player1_9@tennisfolder.com | |
| ☐ player1_6@tennisfolder.com | player1_7@tennisfolder.com | |
| ☐ player1_6@tennisfolder.com | player1_9@tennisfolder.com | |
| ☐ player1_7@tennisfolder.com | player1_10@tennisfolder.com | |
| ☐ player1_7@tennisfolder.com | player1_11@tennisfolder.com | |
| ☐ player1_9@tennisfolder.com | player1_10@tennisfolder.com | |
| ☐ player1_9@tennisfolder.com | player1_11@tennisfolder.com | |
| ☐ player1_5@tennisfolder.com | player1_11@tennisfolder.com | |
| ☐ player1_6@tennisfolder.com | player1_10@tennisfolder.com | |
| ☐ player1_6@tennisfolder.com | player1_11@tennisfolder.com | |
| ☐ player1_10@tennisfolder.com | player1_11@tennisfolder.com | |

[ Submit Lineup ]

| Name | 401 | Lineup 402 | Score 403 | Win 404 | Loss 405 | Draw 406 |
|---|---|---|---|---|---|---|
| Player1_1 Smith ✉<br>📞 408-667-0600 | | S1 | 6-1 6-2 | | | |
| Player1_2 Smith ✉<br>📞 — | | S2 | 7-6 5-7 1-0 | | 1 | |
| player1_3@tennisfolder.com ✉<br>📞 — | | D2 | 6-3 6-3 | 1 | | |
| player1_4@tennisfolder.com ✉<br>📞 — | | D3 | 6-4 6-2 | 1 | 1 | |
| player1_5@tennisfolder.com ✉<br>📞 — | | D1 | 6-2 5-7 1-0 | 1 | | |
| player1_6@tennisfolder.com ✉<br>📞 — | | D2 | 6-3 6-3 | 1 | | |
| player1_7@tennisfolder.com ✉<br>📞 — | | D1 | 6-2 5-7 1-0 | 1 | | |
| player1_8@tennisfolder.com ✉<br>📞 — | | D3 | 6-4 6-1 | | 1 | |

400

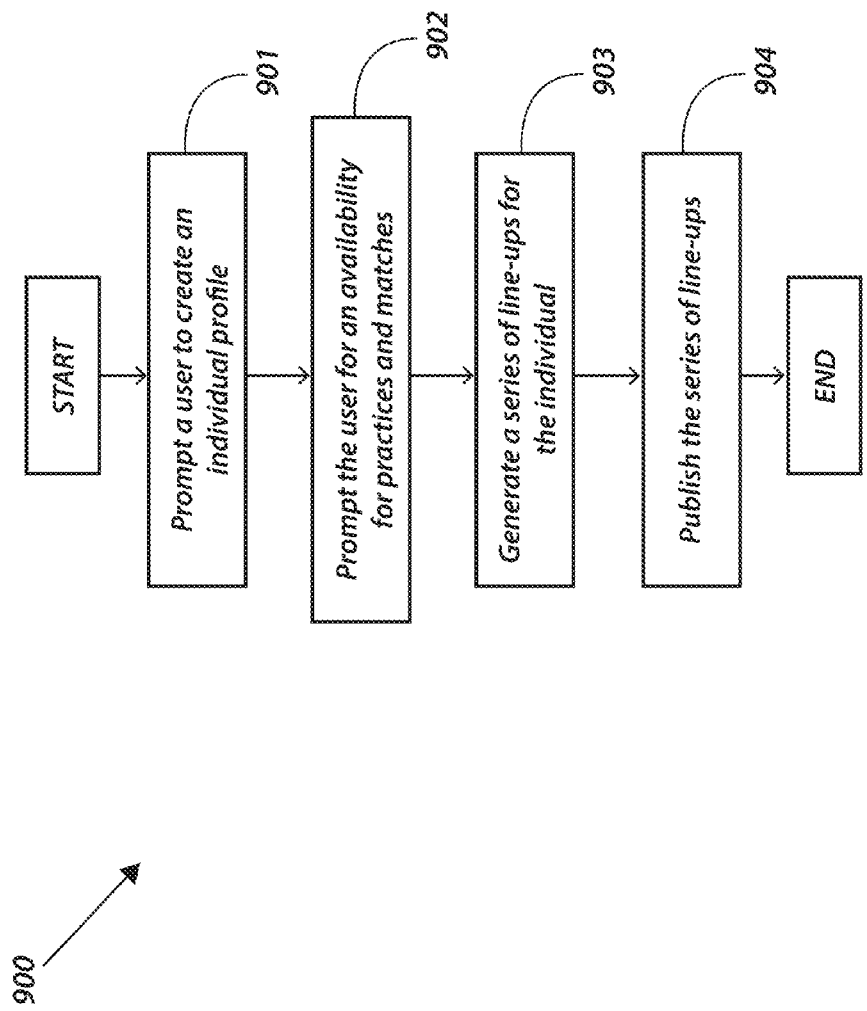

SCHEDULING SYSTEM

FIELD OF THE DISCLOSURE

The present disclosure relates to a novel scheduling system, and in particular, a system for scheduling matches, practices, and related activities.

BRIEF DESCRIPTION OF THE DRAWINGS

To facilitate understanding, identical reference numerals have been used, wherever possible, to designate identical elements that are common to the figures. The drawings are not to scale and the relative dimensions of various elements in the drawings are depicted schematically and not necessarily to scale. The techniques of the present disclosure may readily be understood by considering the following detailed description in conjunction with the accompanying drawings, in which:

FIG. 1 is a screenshot of a window within a software application for users to schedule practices.

FIG. 2 is a screenshot of a window within the software application for users to schedule line-ups for matches.

FIG. 4 is a screenshot of a window within the software application for users to view their wins and losses record during a season of play.

FIG. 9 is yet another flowchart of a method of scheduling matches consistent with the present disclosure.

DETAILED DESCRIPTION

Figure 3:
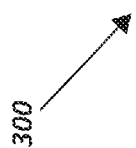
FIG. 3 is a screenshot of a window within the software application for users to schedule their availability for types of matches.

Before the present disclosure is described in detail, it is to be understood that, unless otherwise indicated, this disclosure is not limited to specific procedures or articles, whether described or not.

It is further to be understood that the terminology used herein is for the purpose of describing particular embodiments only and is not intended to limit the scope of the present disclosure.

It must be noted that as used herein and in the claims, the singular forms "a," and "the" include plural referents unless the context clearly dictates otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure. The term "about" generally refers to ±10% of a stated value.

The present disclosure relates to a novel scheduling system and in particular, a system for scheduling matches, practices, and related activities. The novel system includes a non-transitory machine readable storage medium containing instructions to cause a machine to generate a line-up for a match; generate a food assignment for the match; generate a practice schedule; and generate a series of line-ups for a season of play. Additionally, the non-transitory machine readable storage medium further contains instructions to cause a machine to generate a ranking of each sports team.

It should be understood that although some embodiments described herein are related to tennis matches, the present disclosure is not limited thereto. As such, the present disclosure may be amenable to any sports or non-sports competition. For example, the present disclosure may be adapted to any team sport such as football, baseball, basketball, lacrosse, volleyball, water polo, etc. Likewise, the present disclosure may be further adapted to any non-sports such as chess, debate, etc.

Moreover, the present disclosures provides a manner for individuals, such as owners, team captains, etc., to set up team profiles such that matches, practices, and event assignments can be made electronically. As such, leagues can be created such that teams and players can schedule matches along with the ability to update and view their records for any given season. In some implementations, the system may be fed data from other third-party sources such as international league organizations.

A team captain can register a team. For example, a team captain can register a team within a tennis league. Advantageously, once a team is registered, a software application consistent with the present disclosure (as described herein) can be used to organize practices, matches, and communicate with teammates or players on other teams registered within the league.

Upon registering, the software application may request any of a plurality of information. For example, the team captain may be requested to select or submit a team name, choose a league, indicate the gender of team members, select a rating, select a format, and enter the team roster.

Moreover, a team captain may select a team co-captain. In one or more embodiments of the present disclosure, the team co-captain may have the same access of that of the team captain. However, the team captain may have special administrative privileges to restrict the permission settings of the team co-captain.

For some sporting events, it is customary for teams to be responsible for ancillary activities. For instance, in tennis, it is often customary in non-professional leagues for the home team to provide refreshments to the visiting team. As such, the software application described herein may be adaptable to allow users (e.g., team captains) the ability to setup food assignments.

In addition, the software application can be used to invite team members to join and set up profiles. Furthermore, the team members may be asked to select or solicit ideas for the team name, preferred practice times, preferred match times, and preferred food, etc.

Upon signing up, team members can create a profile that includes their personal information along with other pertinent information that may be needed by the team captain to schedule matches, etc. A user's profile may include the user's full name, email address, contact phone number, gender, rating, notification preferences, availability, and records.

FIG. 1 is a screenshot of a window 100 within an application for users to schedule practices. As shown, window 100 allows a team captain (e.g., or co-captain) to select a team (e.g., using scroll bar 101). However, it should be understood by one having ordinary skill in the art that the present disclosure is not limited to this implementation. In some embodiments, a team captain can enter the team name in a designated field.

Window 100 also includes a field 102 for the team captain to enter a practice description or other notes which are distributed to team members. Most importantly, the window 100 includes fields 103, 104 for entering practice dates and times. An indication for the frequency of practices are also configurable as shown by field 105.

Accordingly, the software application provided by the present disclosure gives the user (e.g., captain) the ability to schedule and disseminate notices of practices to team members and other team personnel in an efficient manner.

FIG. 2 is a screenshot 200 of a window within an application for users to schedule line-ups for matches. As shown in the figure, a user can select the names of players for each match type. For example, the team captain can select two players by their identifier (e.g., name and/or email address) for a singles tennis match. Alternatively, the team captain can select players for a doubles tennis match.

FIG. 3 is a screenshot 300 of a window within an application for users to schedule their availability for types of matches. Advantageously, a user administrator can access the availability for matches (by match type) for each player on the team. For instance, Player1_1 Smith is shown to be available for singles and doubles tennis matches.

In one or more embodiments, each entry of the team members listed may include a hyperlink to access the team member's contact information (e.g., phone number, email address, physical address, social media profile, etc.). In the event that not enough players are available for a future match, an error or warning message may be automatically generated.

FIG. 4 is a screenshot 400 of a window within an application for users to view their record during a season of play. The screenshot 400 lists players of a tennis team along with the line-ups and record. For example, screenshot 400 shows line-ups for two singles matches (i.e., S1 and S2), and three doubles matches (i.e., D1, D2, and D3). For instance, for the first doubles match (i.e., D1), both player1_5@tennisfolder.com and player1_7@tennisfolder.com have a "1" in the wins column for match scores of 6-2, 5-7, and 1-0. Contrariwise, for the third doubles match (i.e., D3), both player1_4@tennisfolder.com and player1_8@tennisfolder.com have a "1" in the loss column for match scores of 6-4 and 6-2.

Figure 5:
FIG. 5 is a screenshot of a window within a software application for users to view scheduled matches along with a record of wins and losses for a season.

FIG. 5 is a screenshot 500 of a window within an application for users to view scheduled matches along with a record of wins and losses for a season. In particular, a user can view a list of scheduled tennis matches along with a team's wins and loss record. Additionally, screenshot 500 shows team members to indicate their availability for a match. For example, the matches scheduled on Mar. 22, 2016 at 18:00, eight team members are available for an away game against the Yuba City Yonkers. Alternatively, no team member has indicated their availability for a home game against the London Losers.

Figure 6:
FIG. 6 is a screenshot of a window within the software application for users to select food options for food assignments

FIG. 6 is a screenshot 600 of a window within an application for users to select food options for food assignments. Food assignment duties may be assigned in a round-robin fashion or may be assigned to one team member. Screenshot 600 indicates a team rating (e.g. USTA rating of 3.5). In one or more implementations, a team rating may be imported from a third-party software application. In yet other implementations, a team captain or other authorized team member can import the team's rating into the system. In addition, the gender of the team or team member may be imported.

Most notably, a user may select any of available food options. In particular, screenshot 600 displays default food options 601 which may be modified if desired. For example, the available food options are beer, eggs, dessert, appetizer(s), white wine, any of various main dishes, water/soda, or red wine. In some implementations, a team can view or may receive a message of the food that will be brought to a match.

Figure 7:
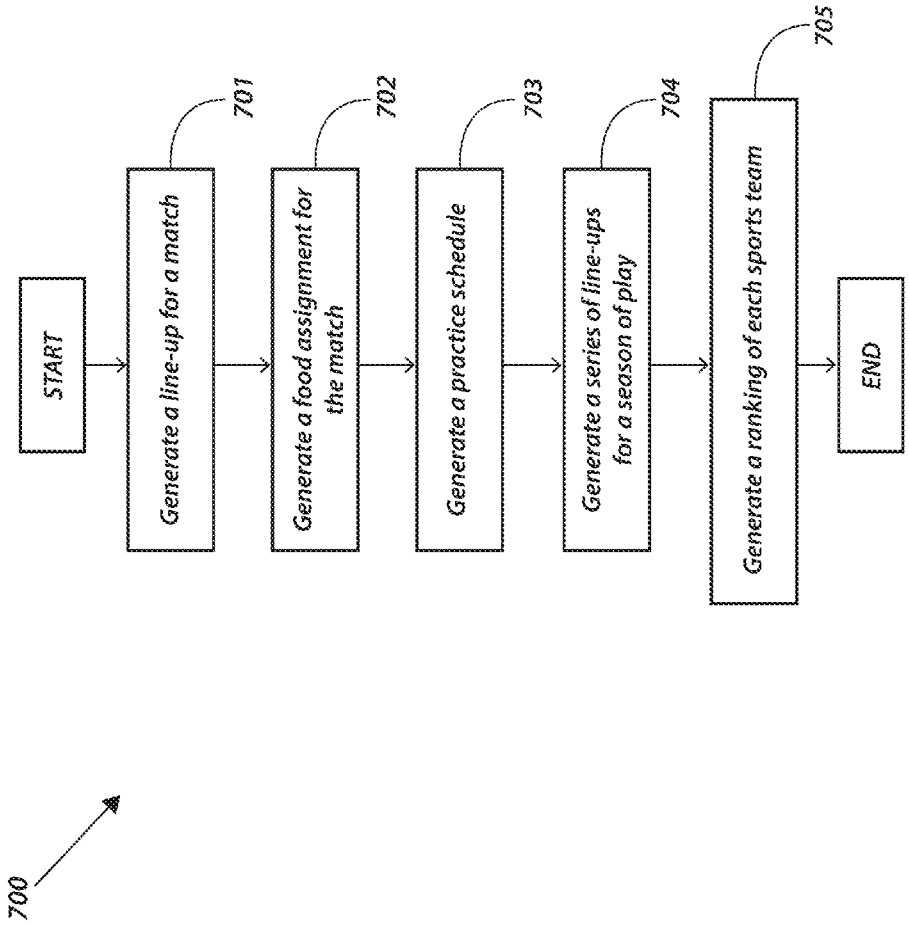
FIG. 7 is a flowchart of a method of scheduling matches consistent with the present disclosure.

FIG. 7 is a flowchart 700 of a method of scheduling matches consistent with the present disclosure. In some implementations, the method described herein may be directed towards league play. It should be understood by those having ordinary skill in the art that the actions described in flowchart 700 may not be executed in any particular order.

Flowchart 700 begins with block 701—generate a line-up for a match. It should be understood that the method disclosed herein is not limited to tennis matches but may be applicable for any competition, particularly sports contests.

Block 702—generate a food assignment for the match. As described with regards to FIG. 6, a user (e.g., any team members) may choose from any available food option. Advantageously, the system described herein provides an efficient manner to handle logistics associated with the match.

Flowchart 700 proceeds to block 703—generate a practice schedule for each sports team. A team captain, co-captain, or other authorized personnel may generate a practice schedule based on team member's availability. Once a practice schedule is created (e.g., for the next week or entire season), the schedule may be published to all that are affiliated with the team (e.g., team members).

In some embodiments, in the event that not enough players have indicated there availability for a practice, the system may send a request (via a social play option) for a tennis player in the area near the practice facility (e.g., configurable) to fill in to avoid cancelling the practice session. As such, the system may allow users to be contacted to fill in for practices if they have indicated such interest in their profile. Moreover, a team captain may indicate whether to allow tennis players from the public to join their team for practices.

In one or more embodiments, the method may also include assigning a venue (e.g., tennis court) for the scheduled practice (or match). Options for the venue may be automatically generated or may be selected manually.

Next, according to some implementations, flowchart 700 proceeds to generate a series of line-ups for a season of play (block 704). The series of line-ups may be generated by receiving the match availability from the team members. Once the series of line-ups are generated, the line-ups may be published to all that are affiliated with the team.

Lastly, according to block 705, generate a ranking of each sports team. In some embodiments, the ranking of each sports team is generated based on a record of wins and losses for each sports team. As described above, a team's ranking may be imported from a third-party source or by manual intervention.

Figure 8:
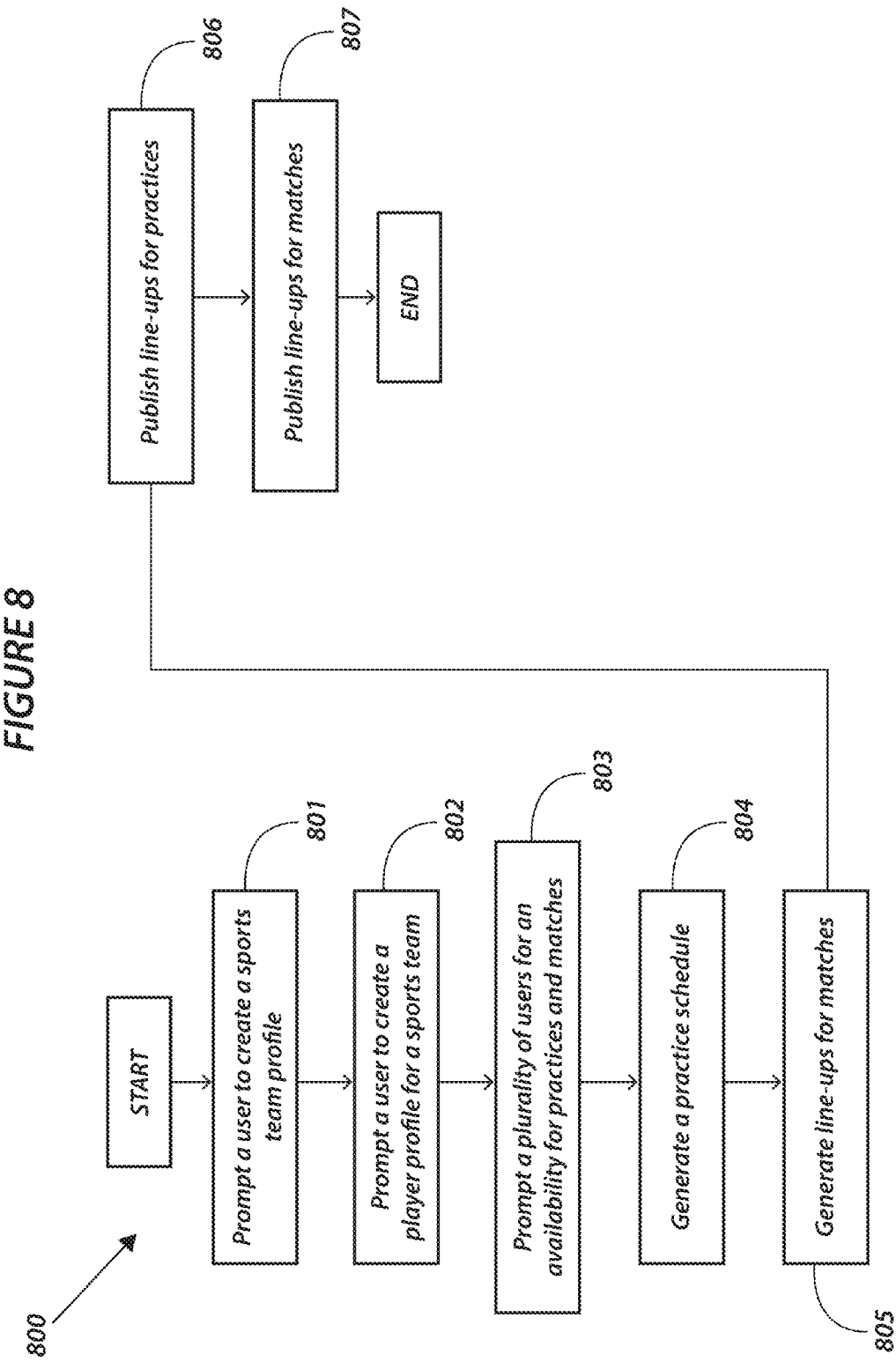
FIG. 8 is another flowchart of a method of scheduling matches consistent with the present disclosure.

FIG. 8 is another flowchart 800 of a method of scheduling matches consistent with the present disclosure. In some implementations, the method described herein may be directed towards league play. It should be understood by those having ordinary skill in the art that the actions described in flowchart 800 may not be executed in any particular order.

Flowchart 800 begins with block 801—prompt a user to create a sports team profile. The team profile may include team information such as, but not limited to, a team's name, logo, record of wins and losses, roster, etc. Advantageously, each team within a league may create a team profile such that each team within the league may be available. A league, or club, may direct team captains to create a sports team profile such that each league has an efficient manner for team supervision and management.

Next, prompt a user to create a player profile for a sports team (block 802). In some implementations, a personal identifier is assigned to each player profile. Accordingly, each player can create a profile such that each team has a player profile for each team member. In some embodiments, any person associated with the team can create a profile to receive updates regarding practices, matches, etc.

Next, prompt a plurality of users for an availability for practices and matches (block 803). Advantageously, once the availability for practices and matches are received from a critical mass of team members, the team captain, co-captain, or other authorized personnel may generate practice schedules and matches.

Next, generate a practice schedule according to block 804. As described above, the practice schedule may be based on player availability.

Block 805—generate line-ups for matches. The strengths of each team member may be displayed on each team's profile may be used as a basis for generating line-ups. For instance, if there are players on the team which have good chemistry, a team captain may factor this in when creating line-ups.

Next, publish line-ups for practices (806) and matches (807). Publishing may be accomplished via email, text message, in-app messaging, or any other suitable means known in the art.

In addition, a court may be assigned for each scheduled match according to some embodiments. The assigned courts may be published according to a pre-determined frequency.

FIG. 9 is yet another flowchart 900 of a method of scheduling matches consistent with the present disclosure. In some implementations, the method described herein may be directed towards social play.

Flowchart 900 begins with block 901—prompt an app user to create an individual profile. The individual profile may include the user's name, player preferences, gender, age, and resident location. For example, the individual profile may include the user's records of wins and losses.

Block 902—prompt the user for an availability of practices and matches. Once the user sets their availability, the system may automatically generate a series of line-ups for the user or provide options for a user to select line-ups for practices and matches. As such, an individual can set up practices and matches with other individuals according to gender, resident location, rating, ranking, etc. Therefore, app users without associates or friends that share the same interest can find other available individuals for sports play. Most importantly, app users can choose to play with individuals of a particular gender, rating, ranking, etc.

Block 903—generate a series of line-ups for the app user. In some embodiments, the series of line-ups (block 904) are published via email, text, in-app messaging, etc.

In some implementations, app users involved in league play may select an option to engage in social play as well. For example, line-ups may be generated based on an app user's gender, resident location, rating, ranking, etc. which may be based in part on the app user's record of wins and losses. Therefore, after a season of play, individual app user's have the capability to effectively find other individuals to practice with or compete against in an efficient manner.

For instance, if an app user is planning to vacation out-of-state, the app user can use the system to set up practice sessions or matches with other individuals at or near the vacation area. In addition, the app users can set up practices and matches during league play.

In addition, a court may be assigned for each scheduled match according to some embodiments. The assigned courts may be published to select individuals according to a pre-determined frequency.

Systems and methods describing the present disclosure have been described. It will be understood that the descriptions of some embodiments of the present disclosure do not limit the various alternative, modified, and equivalent embodiments which may be included within the spirit and scope of the present disclosure as defined by the appended claims. Furthermore, in the detailed description above, numerous specific details are set forth to provide an understanding of various embodiments of the present disclosure. However, some embodiments of the present disclosure may be practiced without these specific details. In other instances, well known methods, procedures, and components have not been described in detail so as not to unnecessarily obscure aspects of the present embodiments.

What is claimed is:

1. A non-transitory machine-readable storage medium containing instructions that, when executed, in response to:
   receiving profiles of a plurality of sports teams, wherein the profile of each sports team comprises profiles of each team member, and
   receiving profiles of a plurality of individuals that are not associated with the sports teams,
   causes a machine to generate a match line-up between at least two sports teams;
   wherein to generate the match line-up is based on the profile of each sports team;
   causes the machine to generate a practice line-up for at least one sports team; and
   causes the machine to employ social play, while accounting for at least one requested preference, in the event that the practice line-up cannot be completely filled for the at least one sports team,
   wherein the preferences comprise player availability;
   wherein social play comprises sending at least one request to at least one of the individuals that are not associated with the sports team and whose profile complies with the at least one requested preference and whose present location is near a venue where the practice is to be held.

2. The non-transitory machine-readable storage medium of claim 1, wherein the profile of each sports team includes a record of wins and losses, a number of matches played, or an availability for a match.

3. The non-transitory machine-readable storage medium of claim 1 further containing instructions to cause the machine to:
   generate a food assignment for the match.

4. The non-transitory machine-readable storage medium of claim 1, wherein the match is a tennis match and the plurality of sports teams are tennis teams.

5. The non-transitory machine-readable storage medium of claim 1 further containing instructions that, when executed, cause a machine to:
generate a series of line-ups for a season of play.

6. The non-transitory machine-readable storage medium of claim 1 further containing instructions that, when executed, cause a machine to:
generate a ranking of each sports team based on a record of wins and losses.

7. The non-transitory machine-readable storage medium of claim 1 further containing instructions that, when executed, cause a machine to:
generate a rating of each sports team.

8. The non-transitory machine-readable storage medium of claim 1 further containing instructions to cause the machine to:
generate an event schedule for each sports team.

9. A non-transitory machine-readable storage medium containing instructions that, when executed,
causes a machine to prompt a user to create a sports team profile;
causes the machine to prompt the user to create a set of preferences for team members; and
causes the machine to employ social play to solicit individuals with submitted profiles to join a team;
wherein social play comprises sending a plurality of requests to a plurality of individuals whose submitted profiles comply with the set of preferences and whose present locations are near at least one venue where competitive matches are to be held.

10. The non-transitory machine-readable storage medium of claim 9, wherein the line-up for a match is based, in part, on gender.

11. The non-transitory machine-readable storage medium of claim 9 further containing instructions to cause the machine to:
generate a practice schedule for each sports team.

12. The non-transitory machine-readable storage medium of claim 9 further containing instructions to cause the machine to:
prompt a user to create a player profile for a sports team.

13. The non-transitory machine-readable storage medium of claim 9 further containing instructions to cause the machine to:
generate the line-up based on player availability.

14. The non-transitory machine-readable storage medium of claim 13 further containing instructions to cause the machine to:
publish the line-up.

15. The non-transitory machine-readable storage medium of claim 9 further containing instructions to cause the machine to:
assign a personal identifier to each player in the line-up.

16. The non-transitory machine-readable medium of claim 9 further containing instructions to cause the machine to:
assign a court for a scheduled match.

17. A non-transitory machine-readable storage medium containing instructions that, when executed,
causes a machine to generate a practice line-up for at least one sports team; and
causes the machine to employ social play, while accounting for at least one requested preference, in the event that a practice line-up cannot be completely filled for the at least one sports team,
wherein the preferences comprise player availability;
wherein social play comprises sending at least one request to at least one of the individuals that are not associated with the sports team and whose profile complies with the at least one requested preference and whose present location is near a venue where the practice is to be held.

18. The non-transitory machine-readable storage medium of claim 17, wherein the preferences further comprise player gender and player rating.

19. The non-transitory machine-readable storage medium of claim 17 further comprising instructions, that when executed, causes a machine to publish the practice line-up.

20. The non-transitory machine-readable storage medium of claim 17 further comprising instructions, that when executed, causes a machine to:
prompt the at least one of the individuals that are not associated with the sports team to create a profile.

* * * * *